US012413006B2

(12) United States Patent
Li et al.

(10) Patent No.: US 12,413,006 B2
(45) Date of Patent: Sep. 9, 2025

(54) SAFETY SHIELD ASSEMBLY FOR POWER RECEPTACLE AND RELATED POWER RECEPTACLE

(71) Applicant: Chengli Li, Suzhou (CN)

(72) Inventors: Chengli Li, Suzhou (CN); Xiaoming Zhang, Suzhou (CN)

(73) Assignee: Chengli Li, Suzhou (CN)

( * ) Notice: Subject to any disclaimer, the term of this patent is extended or adjusted under 35 U.S.C. 154(b) by 457 days.

(21) Appl. No.: 18/170,304

(22) Filed: Feb. 16, 2023

(65) Prior Publication Data

US 2024/0258735 A1 Aug. 1, 2024

(30) Foreign Application Priority Data

Jan. 29, 2023 (CN) ......................... 202310073278.0
Jan. 29, 2023 (CN) ......................... 202320140315.0

(51) Int. Cl.
*H01R 13/447* (2006.01)
*H01R 13/453* (2006.01)

(52) U.S. Cl.
CPC ................................ *H01R 13/4534* (2013.01)

(58) Field of Classification Search
CPC ... H01R 13/4534; H01R 13/44; H01R 13/447
USPC .......................................................... 439/140
See application file for complete search history.

(56) References Cited

U.S. PATENT DOCUMENTS 4,544,219 A 10/1985 Barkas
6,422,880 B1 7/2002 Chiu
6,555,771 B2 * 4/2003 Shao .................. H01R 13/4534 200/51 R
6,776,630 B1 * 8/2004 Huang ............... H01R 13/4534 439/145
6,893,275 B2 * 5/2005 Ng ..................... H01R 13/4534 439/140

(Continued)

FOREIGN PATENT DOCUMENTS

CN 213340816 U 6/2021

OTHER PUBLICATIONS

Chinese Office Action, dated Jan. 26, 2025, and Search Report dated Jan. 22, 2025, in a counterpart Chinese patent application, No. CN 202310073278.0.

(Continued)

*Primary Examiner* — Harshad C Patel
(74) *Attorney, Agent, or Firm* — Chen Yoshimura LLP

(57) ABSTRACT

A safety shield assembly for a power receptacle, including: a slider frame having first and second openings with shapes corresponding to socket holes of the power receptacle; a first slider block disposed in the slider frame, having a first driving portion and a first blocking portion which corresponds in position to the second opening; a second slider block disposed in the slider frame, having a second driving portion and a second blocking portion which corresponds in position to the first opening; and a resilient member disposed between the first and second slider blocks and configured to urge the slider blocks to move relative to each other in the slider frame, to switch between a first state of the safety shield assembly where the first and second openings are respectively covered by the second and first blocking portions and a second state where the first and second openings are exposed.

17 Claims, 10 Drawing Sheets

(56) References Cited

U.S. PATENT DOCUMENTS

| | | | | |
|---|---|---|---|---|
| 7,452,221 B1* | 11/2008 | Oddsen | H01R 13/4534 439/140 |
| 7,527,508 B1* | 5/2009 | Lee | H01R 13/4534 439/137 |
| 7,637,756 B1* | 12/2009 | Hsu | H01R 13/4534 439/145 |
| 7,887,346 B1* | 2/2011 | Huang | H01R 13/4534 439/140 |
| 7,914,307 B1* | 3/2011 | Yang | H01R 13/4534 439/145 |
| 7,934,935 B1* | 5/2011 | Gao | H01R 13/4534 439/137 |
| 8,366,463 B2* | 2/2013 | Zhang | H01R 24/76 439/135 |
| 9,312,625 B2* | 4/2016 | Shen | H01R 13/4534 |
| 9,548,574 B2* | 1/2017 | Hsu | H01R 13/7038 |
| 10,424,863 B1* | 9/2019 | Zhuang | H01R 13/4534 |
| 10,770,823 B1* | 9/2020 | Li | H01R 24/78 |
| 10,804,638 B1* | 10/2020 | Li | H01R 13/4534 |
| 11,431,122 B2* | 8/2022 | Quan | H01R 24/20 |
| 11,456,555 B1* | 9/2022 | Lin | H01R 13/4534 |
| 12,266,881 B2* | 4/2025 | Li | H01R 13/4534 |
| 2003/0017731 A1* | 1/2003 | Huang | H01R 13/4534 439/137 |
| 2005/0026482 A1* | 2/2005 | Huang | H01R 13/4536 439/145 |
| 2010/0041259 A1* | 2/2010 | Ni | H01R 13/4534 439/137 |
| 2010/0317209 A1* | 12/2010 | Huang | H01R 13/4534 439/140 |
| 2015/0380856 A1 | 12/2015 | Mortun et al. | |
| 2016/0013577 A1* | 1/2016 | Diakomis | H01R 13/4536 439/138 |

OTHER PUBLICATIONS

Chinese Office Action, dated Mar. 24, 2025 in a counterpart Chinese patent application, No. CN 202310073278.0.

* cited by examiner

SAFETY SHIELD ASSEMBLY FOR POWER RECEPTACLE AND RELATED POWER RECEPTACLE

BACKGROUND OF THE INVENTION

Field of the Invention

This invention generally relates to home appliances, and in particular, it relates to a safety shield assembly for a power receptacle and a power receptacle having such a safety shield assembly.

Description of Related Art

Power receptacles are widely used in homes and public places. In most receptacles, the socket holes are exposed. If a metal piece or other conductive object is inserted into the socket holes, such as by a child or even by an adult due to inadvertent operation, electrical shocks may result, causing personal harm or property damage. Some existing power receptables have safety shields or shutters, but they often have complex structures and are difficult to assemble. Thus, they are often unsuitable for automated production and assembly, resulting in high cost and low production efficiency. Therefore, there is a need for improved power receptacles with safety shields with simplified structures and reduced manufacturing cost.

SUMMARY

To solve problems of the existing power receptacles, embodiments of the present invention provide a safety shield assembly for power receptacles, having components that can move when objects are inserted into the socket holes of the receptacle, and can prevent undesired objects being inserted or a power plug being incorrectly inserted. This enhance safety of the device, effectively prevents electrical shocks. The safety shield assembly is low cost and easy to manufacture and assemble.

In one aspect, the present invention provides a safety shield assembly for a power receptacle, the safety shield assembly including: a slider frame, having at least a first opening and a second opening having shapes corresponding to shapes of socket holes of the power receptacle; a first slider block, disposed in the slider frame, including a first driving portion and a first blocking portion, the first blocking portion corresponding in position to the second opening; a second slider block, disposed in the slider frame, and including a second driving portion and a second blocking portion, the second blocking portion corresponding in position to the first opening; and a resilient member, disposed between the first slider block and the second slider block, and configured to urge the first slider block and the second slider block to move relative to each other in the slider frame to switch between a first state of the safety shield assembly where the first opening and the second opening are respectively covered by the second blocking portion and the first blocking portion and a second state of the safety shield assembly where the first opening and the second opening are exposed.

Based on the above structure, the present invention includes one or more of the following embodiments.

In some embodiments, the first slider block includes a first base, wherein the first driving portion and first blocking portion extend in opposite directions from the first base; and wherein the second slider block includes a second base, wherein the second driving portion and the second blocking portion extend in opposite directions from the second blocking portion.

In some embodiments, the first slider block and the second slider block are nested, wherein the first blocking portion is disposed adjacent to the second driving portion, and the second blocking portion is disposed adjacent to the first driving portion.

In some embodiments, the first driving portion includes a first inclined surface, the second driving portion includes a second inclined surface, wherein the first inclined surface and the second inclined surface are configured to be pushed by inserted objects to cause the first slider block and the second slider block to slide relative to the slider frame.

In some embodiments, the first slider block and the second slider block are configured to slide to a second state to expose the first opening and the second opening when two objects simultaneously push against the first inclined surface and the second inclined surface.

In some embodiments, the first blocking portion includes a first resilient arm and a second resilient arm, wherein the first resilient arm and the second resilient arm respectively include a first blocking member and a second blocking member respectively located at a free end of the first resilient arm and the second resilient arm, and wherein the first and second resilient arms are configured to change resiliently between an open state where a first passage is formed between the first and second blocking members to allow an inserted object to pass through, and a closed state where the first passage is closed to prevent the inserted object from passing through.

In some embodiments, the first and second blocking members respectively include mating teeth which mate with each other in the closed state.

In some embodiments, the first resilient arm and the second resilient arm are configured to form a second passage between them, the second passage being disposed perpendicularly to the first passage.

In some embodiments, the second blocking portion includes a slot that corresponds in shape to the first opening, and wherein in the second state, the slot and the first opening are aligned and form a through passage.

In some embodiments, the second slider block further includes: a first arm and a second arm, disposed adjacent to the second inclined surface and extend along a same direction as the first resilient arm and the second resilient arm, respectively; a first inclined driving surface and a second inclined driving surface respectively located on the first arm and the second arm and face each other; wherein the first and second blocking members of the first slider block respectively include first and second inclined guiding surfaces respectively corresponding to the first and second inclined driving surfaces and wherein the first and second inclined driving surfaces are configured to move respectively along the first and second inclined guiding surfaces when the second slider block moves from the first state to the second state, causing the first and second blocking members to move to the open state.

In some embodiments, the slider frame further includes one or more hooks or hooking troughs, and the first slider block or the second slider block further includes one or more hooking troughs or hooks cooperating with the hooks or hooking troughs of the slider frame, and wherein the hooks are configured to move along the hooking troughs when the first slider block or the second slider block moves relative to the slider frame.

In some embodiments, the slider frame includes a sidewall configured to limit movement ranges of the first slider block and the second slider block, and wherein the hooks are disposed on two inner surfaces of the sidewall.

In some embodiments, the sidewall of the slider frame includes yielding passages at locations adjacent to the first blocking portion or the second blocking portion.

In some embodiments, the slider frame includes one or more blocking members protruding upwardly from a bottom panel of the slider frame, wherein the blocking members are located within a bottom opening of the first slider block and within a bottom opening of the second slider block, and wherein the first slider block or the second slider block includes a blocking face that cooperates with the blocking members to limit movement range of the first slider block or the second slider block.

In some embodiments, the first slider block and the second slider block respectively include retaining members configured to retain the resilient member between them.

In some embodiments, the resilient member is a spring and the retaining members are protruding posts inserted into two ends of the spring.

In another aspect, the present invention provides a power receptacle, which includes: a shell including a top cover with socket holes; blade-receiving conductor plates disposed within the shell and spatially correspond wo the socket holes; and the above safety shield assembly, disposed between the top cover and the conductor plates.

The safety shield assembly according to embodiments of the present invention has a simple and compact structure, is safe and reliable, and can be used in different types of receptacle structures. Further, the safety shield assembly is easy to assemble, allowing for mass manufacturing and efficient assembly, which reduces cost and increase its applicability.

BRIEF DESCRIPTION OF THE DRAWINGS

Preferred embodiments of the present invention are described with reference to the drawings. In these drawings, like reference symbols represent like features.

DETAILED DESCRIPTION OF PREFERRED EMBODIMENTS

Preferred embodiments of the present and their applications are described below. It should be understood that these descriptions describe embodiments of the present invention but do not limit the scope of the invention. When describing the various components, directional terms such as "up," "down," "top," "bottom" etc. are not absolute but are relative. These terms may correspond to the views in the various illustrations, and can change when the views or the relative positions of the components change.

In the descriptions below, terms such as "comprising", "including", "containing", "having", etc. are intended to be open-ended and do not exclude elements, step or components not specifically listed. The term "consisting of" excludes elements, step or components not specifically listed. The term "consisting essentially of" means including the specifically listed elements, step or components and other elements, step or components that do not materially affect the basic and novel characteristics of the claimed invention. The term "comprising" covers "consisting of" and "consisting essentially of".

In this disclosure, unless specifically indicated, terms such as "first", "second", etc. do not connote a temporal or spatial sequence or a particular number of parts.

In this disclosure, unless otherwise indicated, terms such as "mount", "connect", "couple", "link" etc. should be understood broadly; for example, they may be fixed connections, or removable or detachable connections, or integrally connected for integrally formed; they may be directly connected, or indirectly connected via intermediate parts, and may refer to internal connection of two components or mutual interactions of two components. Those skilled in the relevant art can readily understand the meaning of these terms as used in this disclosure based on the specific description and context.

Figure 3A:
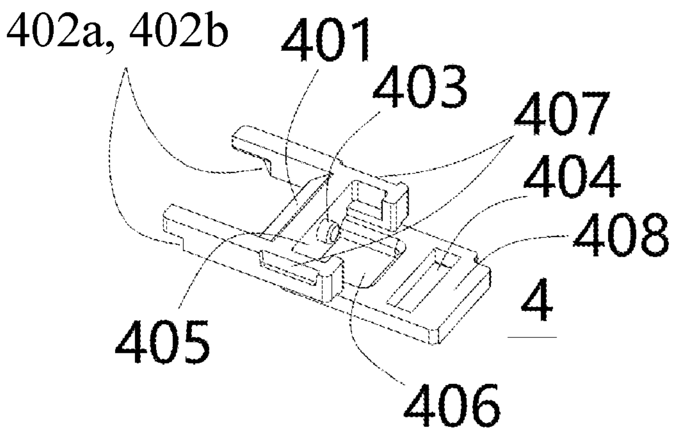
FIG. 3A illustrates a second slider block of the safety shield assembly of FIG. 1.
Figure 3B:
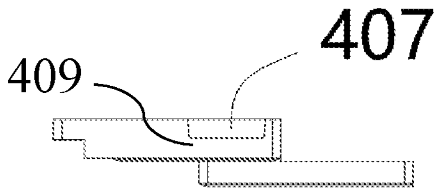
FIG. 3B illustrates a side view of the second slider block.
Figure 3C:
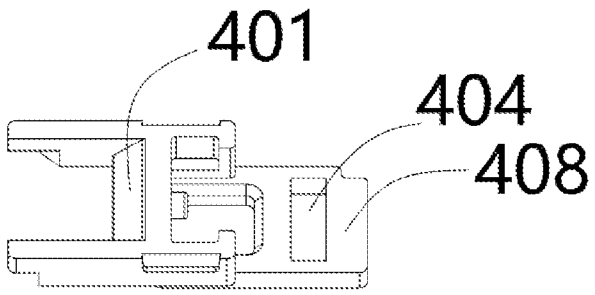
FIG. 3C illustrates the second slider block from another viewing angle.
Figure 4:
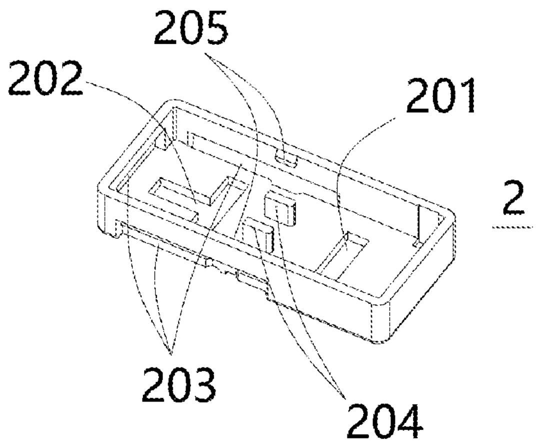
FIG. 4 illustrates a slider frame of the safety shield assembly.
Figure 5:
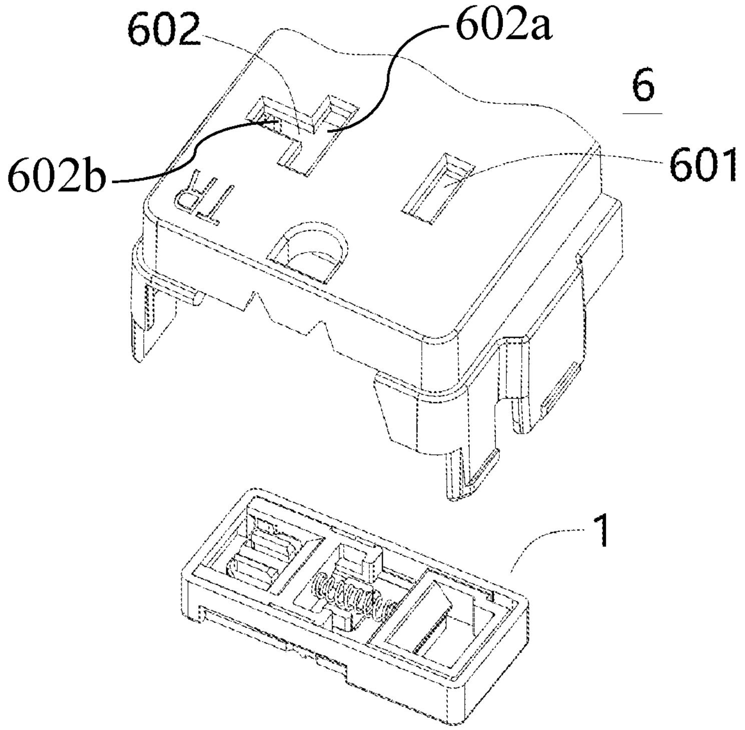
FIG. 5 illustrates the safety shield assembly and the top cover of the receptacle.

Referring to FIGS. 1-5, a safety shield assembly 1 for a power receptacle according to embodiments of the present invention includes a slider frame 2, and a first slider block 3, a second slider block 4 and a resilient member 5 that are disposed in the slider frame 2. The slider frame 2 defines multiple openings on the bottom having shapes that correspond to the socket holes of the receptacle, which may be I-shaped and/or T-shaped. For example, in the example shown in FIG. 4, the slider frame 2 has an I-shaped first opening 201 and a T-shaped second opening 202, suitable for different types of receptacles. For example, FIG. 5 shows a top cover 6 of the receptacle having three socket holes, where the first opening 201 and second opening 202 of the slider frame 2 respectively correspond to the I-shaped first socket hole 601 and the T-shaped second socket hole 602. Of course, when both the first and second socket holes are I-shaped, the T-shaped opening of the slider frame 2 is still suitable. For convenience, the direction in which the I-shaped socket hole extends is referred to as the longitudinal direction; the T-shaped socket hole includes a longitudinal portion 602*a* and a transverse portion 602*b*.

According to embodiments of the present invention, the first slider block 3 includes a first driving portion and a first blocking portion, the first blocking portion spatially corresponding to the second opening 202; the second slider block 4 includes a second driving portion and a second blocking portion, the second blocking portion spatially corresponding to the first opening 201. The resilient member 5 is disposed between the first slider block 3 and second slider block 4, and can urge the first slider block 3 and second slider block 4 to move relative to each other in the slider frame 2, so as to switch between a first state of the safety shield assembly 1 where the first opening 201 and the second opening 202 are covered and a second state of the safety shield assembly 1 where the first opening 201 and the second opening 202 are exposed. Advantageously, the initial state of the resilient member 5 corresponds to the first state, i.e. where the first slider block 3 and second slider block 4 cover the first and second openings. Thus, the safety shield assembly can effectively prevent undesirable objects being inserted into the socket holes or a plug being incorrectly inserted. In addition, in the initial state, the safety shield assembly can isolate the components inside the receptable from the external environment, and protect them from external environmental factors (dust, moisture, etc.).

According to embodiments of the present invention, when a single object is inserted into one of the socket holes, the sliding movement of the first slider block 3 and second slider block 4 will not expose the openings of the slider frame 2. When two objects are simultaneously inserted into the two socket holes, the first slider block 3 and second slider block 4 move simultaneously and expose the openings of the slider frame 2.

More specifically, referring to FIGS. 2A-3C, in the illustrated embodiment, the first slider block 3 includes a first base 309, and a first driving portion 302 and a first blocking portion 308 extending from the first base 309 in opposite directions. The second slider block 4 includes a second base 409, and a second driving portion 401 and a second blocking portion 408 extending from the second base 409 in opposite directions.

In some embodiments, the first slider block 3 and second slider block 4 are nested, with the first blocking portion 308 disposed adjacent to the second driving portion 401, and the second blocking portion 408 disposed adjacent to the first driving portion 302. In this embodiment, the first slider block 3 has an opening 307; during assembly, the second blocking portion 408 may be inserted in an inclined manner to a position below the first driving portion 302, and the second driving portion 401 is placed above the first blocking portion 308, thereby completing the assembly of the two slider blocks, such that the two slider blocks are parallel to each other and can slide relative to each other. Thereafter, the two slider blocks are placed into the slider frame 2, so that the first blocking portion 308 of the first slider block 3 covers the second opening 202, and the second blocking portion 408 of the second slider block 4 covers the first opening 201. Then, the resilient member 5 is compressed and inserted between the first slider block 3 and second slider block 4 and retained there. This completes the assembly of the safety shield assembly 1.

Figure 1:
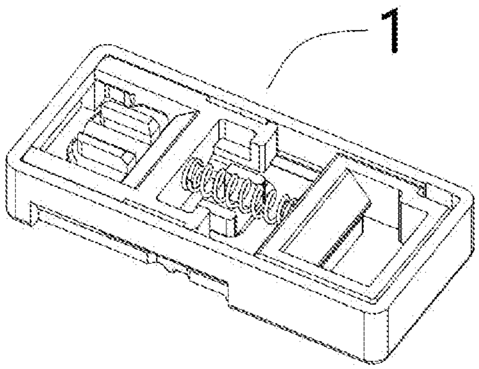
FIG. 1 illustrates a safety shield assembly for a power receptacle according to an embodiment of the present invention.
Figure 2:
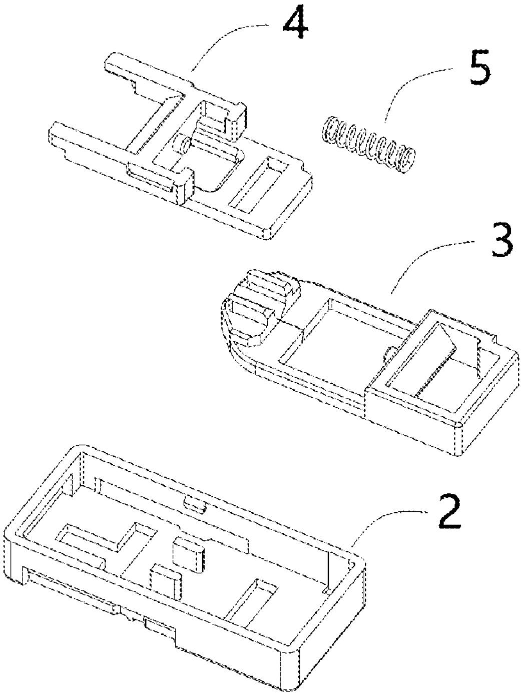
FIG. 2 is an exploded view of the safety shield assembly of FIG. 1.
Figure 2A:
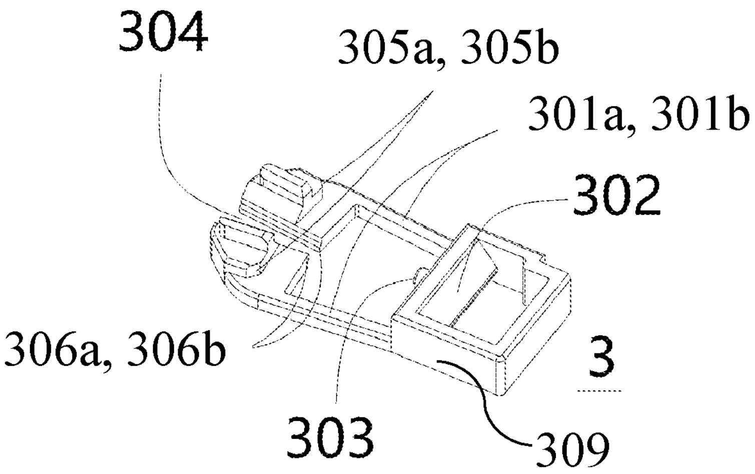
FIG. 2A illustrates a first slider block of the safety shield assembly of FIG. 1, showing the first blocking portion in an open state.

In some embodiments, the first driving portion 302 includes a first inclined surface, as shown in FIG. 2A; the second driving portion 401 includes a second inclined surface, as shown in FIG. 3A. The two inclined surfaces are inclined in opposite directions. An inserted object, when pushed against the first and/or second inclined surface, can move along the inclined surface thereby driving the first slider block 3 and/or second slider block 4 to slide. The resilient member 5 may be a spring, and the first slider block 3 and second slider block 4 respectively have retaining members to retain the resilient member 5. For example, a first protruding post 303 may be formed on the first base 309 and a second protruding post 403 may be formed on the second base 409 opposite the first protruding post 303, as shown in FIG. 2A. The two protruding posts are respectively inserted into the two ends of the resilient member 5 to retain the resilient member 5. This simplifies the structure and reduces the space occupied by the safety shield assembly in the receptacle. It should be understood that other retaining structures may alternatively be used. For example, the two protruding posts may be replaced by two recesses that accommodate the two ends of the resilient member 5.

When two objects are inserted into the socket holes and simultaneously push against the first inclined surface (first driving portion 302) and the second inclined surface (second driving portion 401), the first slider block 3 and second slider block 4 slide simultaneously and compress the resilient member 5 from both ends, and the safety shield assembly 1 is in the second state where the first opening 201 and the second opening 202 are exposed. When only one object is inserted into one socket hole and pushes against only one of the first and second inclined surfaces, the corresponding sliding movement of the first 3 or second slider block 4 only compresses the resilient member 5 from one end; in this condition, the first blocking portion 308 which extends away from the first driving portion 302 and the second blocking portion 408 which extends away from the second driving portion 401 still respectively cover the second opening 202 or the first opening 201 (the one that corresponds to the inserted object), achieving the protection function.

Figure 2B:
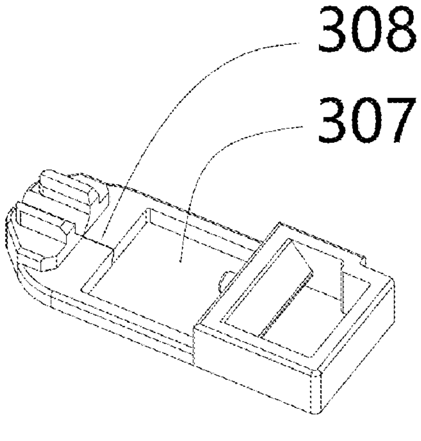
FIG. 2B illustrates the first slider block of the safety shield assembly of FIG. 1, showing the first blocking element in a closed state.

Referring to FIG. 2A or 2B, in the illustrated embodiment, the first blocking portion 308 includes a first resilient arm 301*a* and a second resilient arm 301*b*. The free ends of the first and second resilient arms respectively form first and second blocking members. The first and second resilient arms are configured to change resiliently between an open state where a first passage 304 is formed between the first and second blocking members to allow an inserted object to pass through, and a closed state where the first passage 304 is closed to prevent the inserted object from passing through.

FIG. 2A illustrates the open state, and FIG. 2B illustrates the closed state. In some embodiments, the first and second blocking members respectively have mating teeth 306*a*, 306*b* which mate with each other in the closed state.

In the illustrated embodiment, the first passage 304 spatially corresponds to the transverse portion 602*b* of the second socket hole 602. For the longitudinal portion 602*a* of the second socket hole 602, a second passage is formed between the first resilient arm 301*a* and second resilient arm 301*b*, disposed perpendicularly to the first passage 304 in the top view. Optionally, the second passage is formed by a portion of the opening 307 of the first slider block 3.

Referring to FIG. 3A-3C, in the illustrated embodiment, the second blocking portion 408 is plate shaped, and has a slot 404 that corresponds in shape to the first opening 201. In the second state, the slot 404 and the first opening 201 are aligned and form a through passage. The second slider block 4 further includes a first arm and a second arm, which are disposed adjacent to the second inclined surface and extend along the same direction as the first resilient arm 301*a* and second resilient arm 301*b*, respectively. The second slider block 4 further has inclined driving surfaces 402*a*, 402*b* respectively located on the first and second arms and face each other. Correspondingly, the first and second blocking member of the first slider block 3 respectively have inclined guiding surfaces 305*a*, 305*b* which respectively correspond to the inclined driving surfaces 402*a*, 402*b*. When the second slider block 4 moves from the first state to the second state, the inclined driving surfaces 402*a*, 402*b* move respectively along the inclined guiding surfaces 305*a*, 305*b*, causing the first and second blocking members to move to the open state. Conversely, when the second slider block 4 moves from the second state to the first state, the inclined driving surfaces 402*a*, 402*b* move respectively along the inclined guiding surfaces 305*a*, 305*b*, causing the first and second blocking members to move to the closed state.

FIG. 4 illustrates the slider frame 2 according to an embodiment of the present invention. Optionally, the slider frame 2 has hooks or hooking troughs for retaining the first slider block 3 and/or the second slider block 4, and correspondingly, the first slider block 3 and/or the second slider block 4 has hooking troughs or hooks to cooperate with the slider frame 2. FIGS. 3A-3C illustrate hooking troughs 407 on the second slider block 4, and FIG. 4 illustrates hooks 205 on the slider frame 2. When the first slider block 3 and/or second slider block 4 move relative to the slider frame 2, the hooks 205 move along the hooking troughs 407. Advantageously, the slider frame 2 includes a sidewall to limit the movement ranges of the first slider block 3 and second slider block 4, and the hooks 205 are disposed on two inner surfaces of the sidewall, such as two opposing inner surfaces. The hooking troughs 407 on the second slider block 4 can serve to retain the two slider blocks inside the slider frame and prevent them from falling off, without limiting the relative sliding movement of the slider blocks.

Because the first blocking portion 308 is configured to change between the open state and closed state, the sidewall of the slider frame 2 may be provided with yielding passages at locations adjacent to the first blocking portion 308, so that the sidewall does not interfere with the first blocking portion when the first and second blocking members open, so that they can freely open during normal use. In the illustrated embodiment of FIG. 4, three yielding passages 203 are provided on three sides of the sidewall.

In some embodiments, the slider frame 2 has blocking members 204 (two are shown in FIG. 4) that protrude upwardly from the bottom panel. When assembled, the blocking members 204 are located within the opening 307 of the first slider block 3, and also within a bottom opening 406 of the second slider block 4. The first slider block 3 or second slider block 4 has blocking faces that cooperate with the blocking members 204 to limit the movement range of the first slider block 3 or second slider block 4. FIG. 3A shows a blocking face 405 on the second slider block 4 as an example.

The operations of the safety shield assembly 1 are described below with reference to FIGS. 6A-10B.

The receptacle includes a shell (body) and blade-receiving conductor plates 801, 802 disposed within the shell. The shell includes a top cover 6 and a base 7 joined to each other. The safety shield assembly 1 is disposed between the top cover 6 and the conductor plates 801, 802.

Figure 6A:
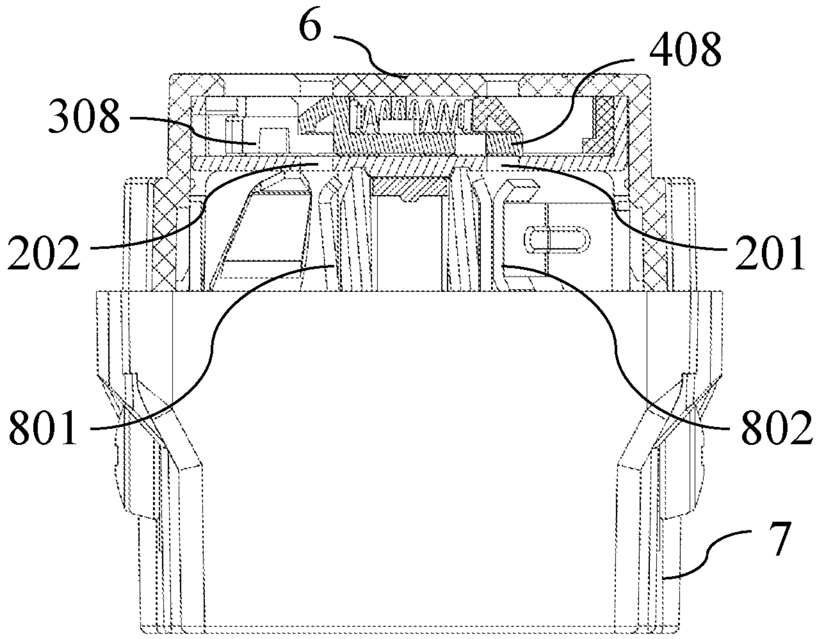
FIG. 6A is a cross-sectional view of a power receptacle with the safety shield assembly according to an embodiment of the present invention, showing its initial state without any object inserted into the socket holes.
Figure 6B:
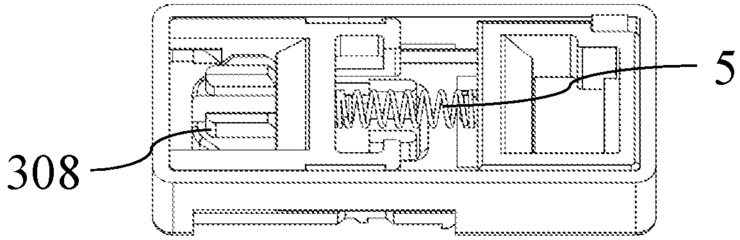
FIG. 6B is a perspective view of the safety shield assembly in the state shown in FIG. 6A.
Figure 6C:
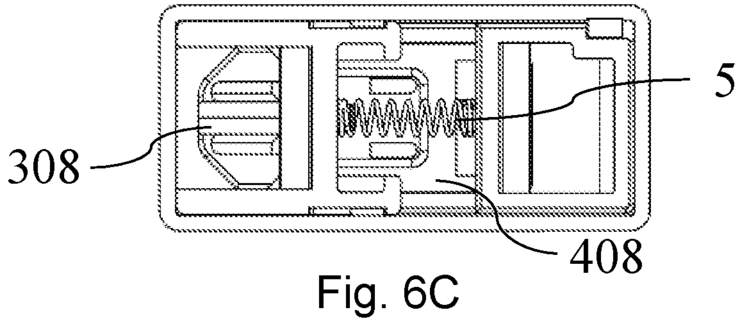
FIG. 6C is a top plan view of the safety shield assembly in the state shown in FIG. 6A.

When no object is inserted into any socket hole, as shown in FIGS. 6A-6C, because of the action of the resilient member 5, the first slider block 3 and second slider block 4 are in the first state, and the safety shield assembly 1 is in the closed state. In this state, the first blocking portion 308 and second blocking portion 408 cover the second opening 202 and the first opening 201.

Figure 7A:
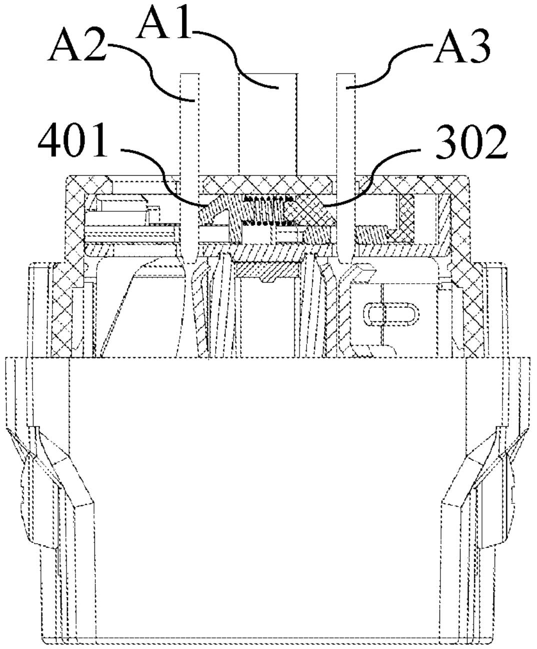
FIG. 7A is a cross-sectional view of the power receptacle with the safety shield assembly, showing its state when a plug having two longitudinal insertion blades is inserted into the socket holes.

FIG. 7A shows the operation when an electrical plug having insertion blades A1, A2, A3 is plugged into the receptacle. When the two longitudinal and parallel blades A2 and A3 are inserted into the socket holes and contact the first driving portion 302 and second driving portion 401 of the two slider blocks, the insertion blades respectively push the first slider block 3 and second slider block 4, causing them to move relative to each other against the elastic force of the resilient member 5. As a result, the movements of the first blocking portion 308 and second blocking portion 408 expose the first opening 201, as well as the portion of the second opening 202 that correspond to the longitudinal portion 602*a* of the second socket hole 602 (i.e. the second passage), so that both blades can be inserted through the safety shield assembly 1 into the receptacle and contact the conductor plates 801, 802, to conduct electricity.

Figure 7B:
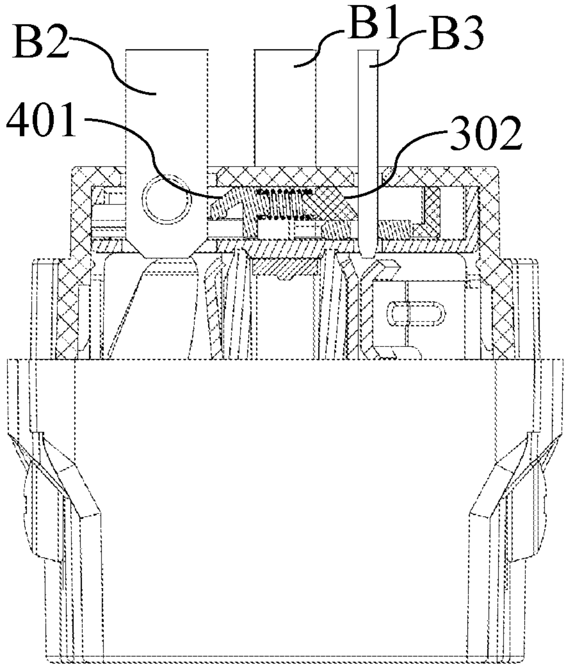
FIG. 7B is a cross-sectional view of the power receptacle with the safety shield assembly, showing its state when a plug having one longitudinal and one transverse insertion blade is inserted.

FIG. 7B shows the operation when an electrical plug having insertion blades B1, B2, B3 is plugged into the receptacle. When the one longitudinal blade B3 and one transverse blade B2 are inserted into the socket holes and contact the first driving portion 302 and second driving portion 401 of the two slider blocks, the insertion blades respectively push the first slider block 3 and second slider block 4, causing them to move relative to each other against the elastic force of the resilient member 5. As a result, the movements of the first blocking portion 308 and second blocking portion 408 expose the first opening 201. Meanwhile, the inclined driving surfaces 402*a*, 402*b* of the second slider block 4 move along the inclined guiding surfaces 305*a*, 305*b* of the first slider block 3, causing the first and second blocking members of the first slider block 3 to be in the open state. This exposes the portion of second opening 202 that corresponds to the transverse portion 602*b* of the second socket hole 602 (i.e. the first passage), so that both blades can be inserted into the receptacle and contact the conductor plates 801, 802, to conduct electricity.

Figure 7C:
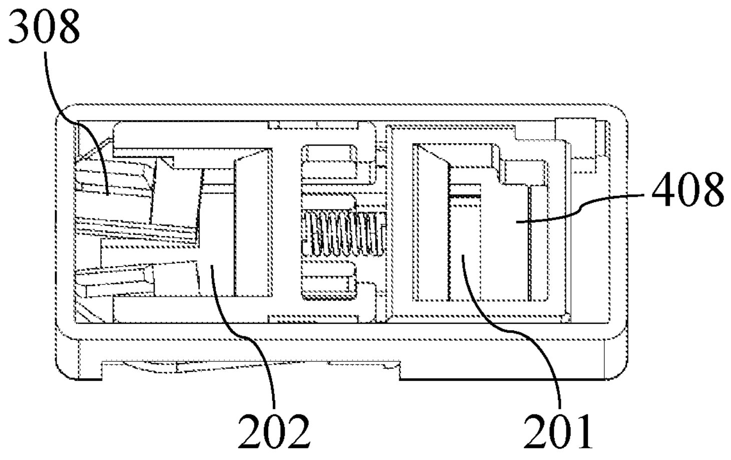
FIG. 7C is a perspective view of the safety shield assembly in the state shown in FIG. 7A or 7B.
Figure 7D:
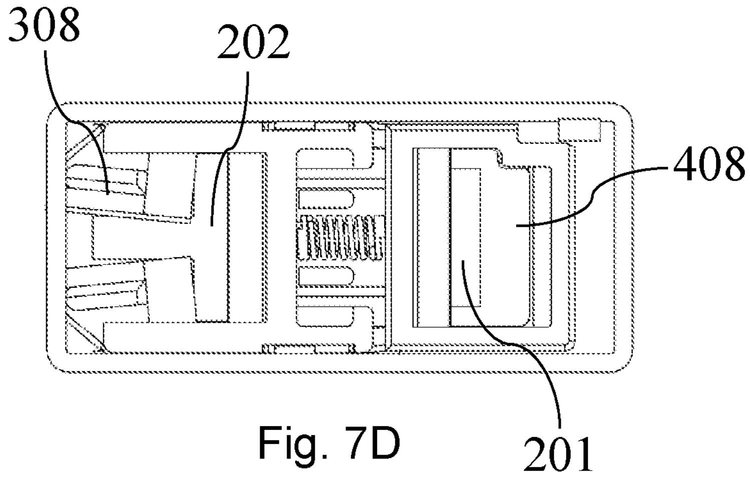
FIG. 7D is a top plan view of the safety shield assembly in the state shown in FIG. 7A or 7B.

FIGS. 7C and 7D show the safety shield assembly 1 in the state where a plug is normally plugged into the receptacle. It should be understood that when the plug is removed from the receptacle, the first slider block 3 and second slider block 4 will return to their initial state under the force of the resilient member 5, and continue to function to protect the receptacle.

Figure 8A:
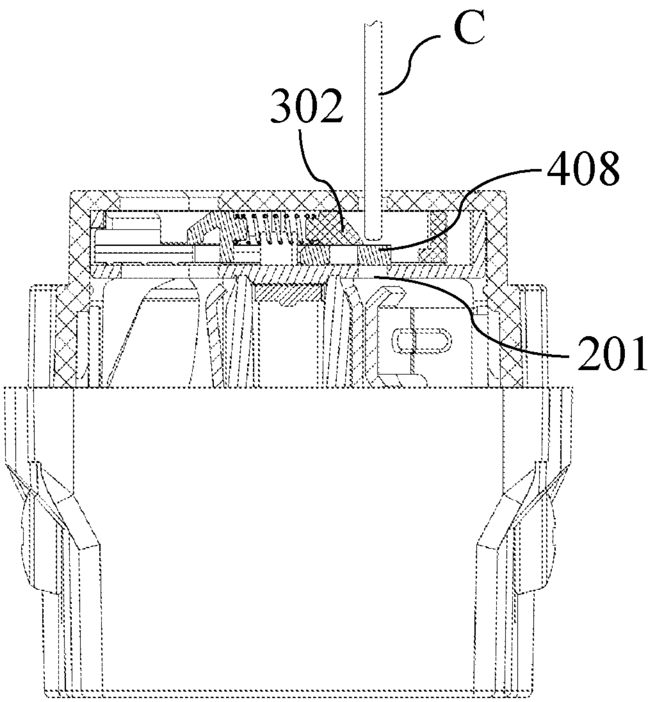
FIG. 8A is a cross-sectional view of the power receptacle with the safety shield assembly, showing its state when a single object is inserted in the first socket hole.
Figure 8B:
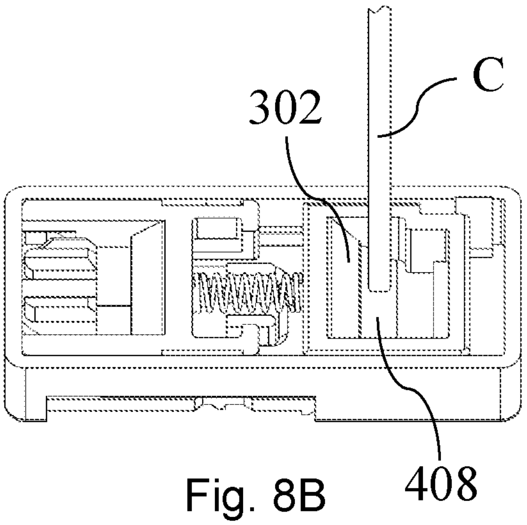
FIG. 8B is a perspective view of the safety shield assembly in the state shown in FIG. 8A.

FIGS. 8A and 8B show a state where a single object C is inserted into one of the socket holes, in this example the hole on the right. The object pushes the first driving portion 302 of the first slider block 3 and moves downwardly, so the first slider block 3 exerts a compressing force on the resilient member 5. Because the second driving portion 401 of the second slider block 4 is not acted upon by any object, the second slider block 4 is urged toward the left by the force of the resilient member 5. Therefore, the second blocking portion 408 still covers the first opening 201, so that the object C cannot be inserted through the safety shield assembly 1 into the receptacle.

Figure 9A:
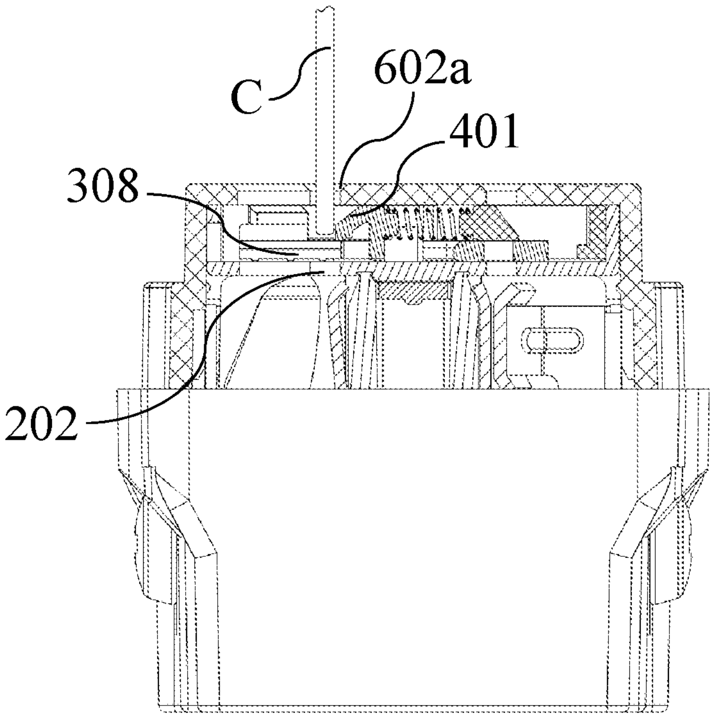
FIG. 9A is a cross-sectional view of the power receptacle with the safety shield assembly, showing its state when a single object is inserted in the longitudinal portion of the second socket hole.
Figure 9B:
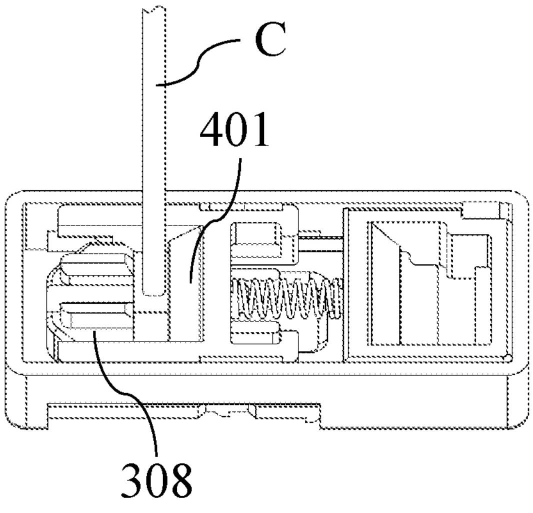
FIG. 9B is a perspective view of the safety shield assembly in the state shown in FIG. 9A.

Similarly, as shown in FIGS. 9A and 9B, when the single object C is inserted into the socket hole on the left, into the area corresponding to the longitudinal portion 602*a* of the second socket hole 602, the object pushes the second driving portion 401 of the second slider block 4 and moves downwardly, so the second slider block 4 exerts a force on the resilient member 5. Because the first driving portion 302 of the first slider block 3 is not acted upon by any object, the first slider block 3 is urged toward the right by the force of the resilient member 5. The first blocking portion 308 still covers the second opening 202, so that the object C cannot be inserted through the safety shield assembly 1 into the receptacle.

Figure 10A:
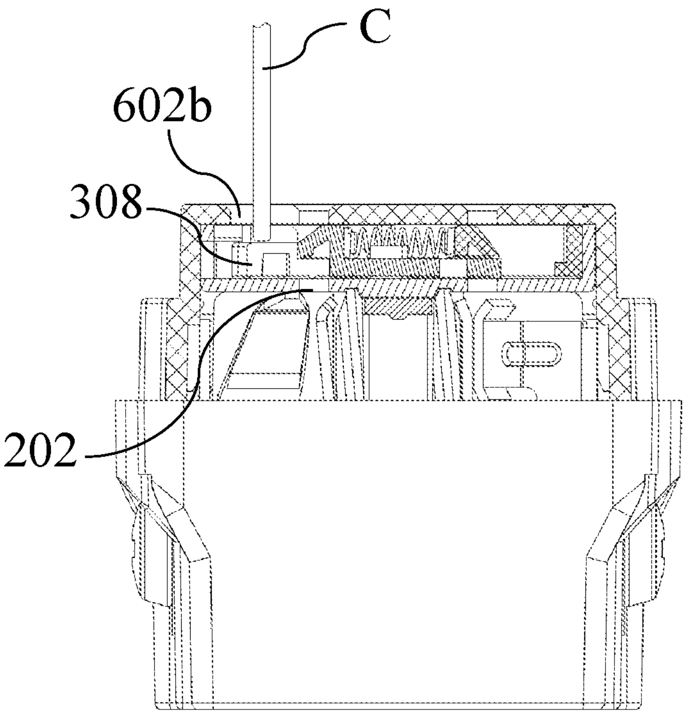
FIG. 10A is a cross-sectional view of the power receptacle with the safety shield assembly, showing its state when a single object is inserted in the transverse portion of the second socket hole.
Figure 10B:
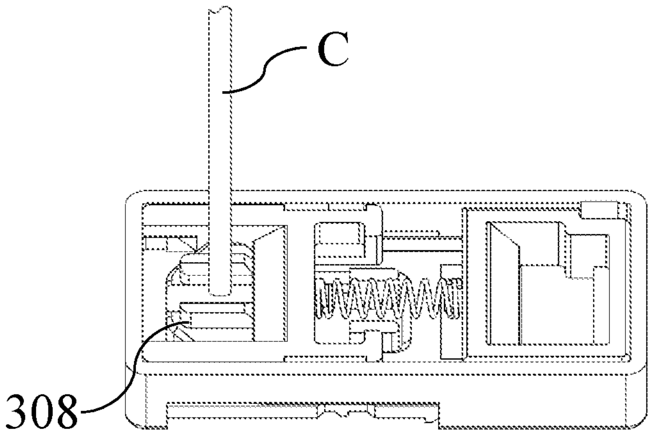
FIG. 10B is a perspective view of the safety shield assembly in the state shown in FIG. 10A.

As shown in FIGS. 10A and 10B, when the single object C is inserted into the socket hole on the left, into the area corresponding to the transverse portion 602*b* of the second socket hole 602, the object does not contact either the second driving portion 401 of the second slider block 4 or the first driving portion 302 of the first slider block 3. The first blocking portion 308 still covers the second opening 202, and the object C cannot be inserted through the safety shield assembly 1 into the receptacle. Therefore, the safety shield assembly 1 protects the receptacle and prevents electrical shock to the user.

The safety shield assembly according to embodiments of the present invention has a simple and compact structure, is safe and reliable, and can be used in different types of receptacle structure without significant change, making it versatile. Further, the safety shield assembly is made of a small number of components, and the components can restrain the positions of each other, allowing for automatic manufacturing and assembly.

It should be understood that the embodiments shown in the drawings only illustrate the preferred shapes, sizes and spatial arrangements of the various components of the safety shield assembly and receptacle. These illustrations do not limit the scope of the invention; other shapes, sizes and spatial arrangements may be used without departing from the spirit of the invention. Further, the slider frame, first slider block and second slider block in the above embodiments are each integrally formed as one piece, making them easy to manufacture and assemble. Each of these parts may also be formed as multiple pieces or multiple groups, depending on the number of socket holes of the receptacle, It will be apparent to those skilled in the art that various modification and variations can be made in the embodiments of the present invention without departing from the spirit or scope of the invention. Thus, it is intended that the present invention cover modifications and variations that come within the scope of the appended claims and their equivalents.

What is claimed is:

1. A safety shield assembly for a power receptacle, the safety shield assembly comprising:

a slider frame, having at least a first opening and a second opening having shapes corresponding to shapes of socket holes of the power receptacle;

a first slider block, disposed in the slider frame, including a first driving portion and a first blocking portion, the first blocking portion corresponding in position to the second opening;

a second slider block, disposed in the slider frame, and including a second driving portion and a second blocking portion, the second blocking portion corresponding in position to the first opening; and a resilient member, disposed between the first slider block and the second slider block, and configured to urge the first slider block and the second slider block to move relative to each other in the slider frame to switch between a first state of the safety shield assembly where the first opening and the second opening are respectively covered by the second blocking portion and the first blocking portion and a second state of the safety shield assembly where the first opening and the second opening are exposed.

2. The safety shield assembly of claim 1, wherein the first slider block includes a first base, wherein the first driving portion and first blocking portion extend in opposite directions from the first base; and wherein the second slider block includes a second base, wherein the second driving portion and the second blocking portion extend in opposite directions from the second blocking portion.

3. The safety shield assembly of claim 1, wherein the first slider block and the second slider block are nested, wherein the first blocking portion is disposed adjacent to the second driving portion, and the second blocking portion is disposed adjacent to the first driving portion.

4. The safety shield assembly of claim 1, wherein the first driving portion includes a first inclined surface, the second driving portion includes a second inclined surface, wherein the first inclined surface and the second inclined surface are configured to be pushed by inserted objects to cause the first slider block and the second slider block to slide relative to the slider frame.

5. The safety shield assembly of claim 4, wherein the first slider block and the second slider block are configured to slide to a second state to expose the first opening and the second opening when two objects simultaneously push against the first inclined surface and the second inclined surface.

6. The safety shield assembly of claim 4, wherein the first blocking portion includes a first resilient arm and a second resilient arm, wherein the first resilient arm and the second resilient arm respectively include a first blocking member and a second blocking member respectively located at a free end of the first resilient arm and the second resilient arm, and wherein the first and second resilient arms are configured to change resiliently between an open state where a first passage is formed between the first and second blocking members to allow an inserted object to pass through, and a closed state where the first passage is closed to prevent the inserted object from passing through.

7. The safety shield assembly of claim 6, wherein the first and second blocking members respectively include mating teeth which mate with each other in the closed state.

8. The safety shield assembly of claim 6, wherein the first resilient arm and the second resilient arm are configured to form a second passage between them, the second passage being disposed perpendicularly to the first passage.

9. The safety shield assembly of claim 6, wherein the second slider block further includes:

a first arm and a second arm, disposed adjacent to the second inclined surface and extend along a same direction as the first resilient arm and the second resilient arm, respectively;

a first inclined driving surface and a second inclined driving surface respectively located on the first arm and the second arm and face each other;

wherein the first and second blocking members of the first slider block respectively include first and second inclined guiding surfaces respectively corresponding to the first and second inclined driving surfaces and wherein the first and second inclined driving surfaces are configured to move respectively along the first and second inclined guiding surfaces when the second slider block moves from the first state to the second state, causing the first and second blocking members to move to the open state.

10. The safety shield assembly of claim 1, wherein the second blocking portion includes a slot that corresponds in shape to the first opening, and wherein in the second state, the slot and the first opening are aligned and form a through passage.

11. The safety shield assembly of claim 1, wherein the slider frame further includes one or more hooks or hooking troughs, and the first slider block or the second slider block further includes one or more hooking troughs or hooks cooperating with the hooks or hooking troughs of the slider frame, and wherein the hooks are configured to move along the hooking troughs when the first slider block or the second slider block moves relative to the slider frame.

12. The safety shield assembly of claim 11, wherein the slider frame includes a sidewall configured to limit movement ranges of the first slider block and the second slider block, and wherein the hooks are disposed on two inner surfaces of the sidewall.

13. The safety shield assembly of claim 12, wherein the sidewall of the slider frame includes yielding passages at locations adjacent to the first blocking portion or the second blocking portion.

14. The safety shield assembly of claim 1, wherein the slider frame includes one or more blocking members protruding upwardly from a bottom panel of the slider frame, wherein the blocking members are located within a bottom opening of the first slider block and within a bottom opening of the second slider block, and wherein the first slider block or the second slider block includes a blocking face that cooperates with the blocking members to limit movement range of the first slider block or the second slider block.

15. The safety shield assembly of claim 1, wherein the first slider block and the second slider block respectively include retaining members configured to retain the resilient member between them.

16. The safety shield assembly of claim 15, wherein the resilient member is a spring and the retaining members are protruding posts inserted into two ends of the spring.

17. A power receptacle comprising:

a shell including a top cover with socket holes;

blade-receiving conductor plates disposed within the shell and spatially correspond wo the socket holes; and the safety shield assembly of claim 1, disposed between the top cover and the conductor plates.

* * * * *